US011288117B2

(12) United States Patent
Sutton et al.

(10) Patent No.: US 11,288,117 B2
(45) Date of Patent: Mar. 29, 2022

(54) PREDICTIVE SYSTEM REMEDIATION

(71) Applicant: Oracle International Corporation, Redwood Shores, CA (US)

(72) Inventors: Eric Sutton, Redwood City, CA (US); Dustin Garvey, Exeter, NH (US); Sampanna Shahaji Salunke, Dublin, CA (US); Uri Shaft, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 297 days.

(21) Appl. No.: 16/532,548

(22) Filed: Aug. 6, 2019

(65) Prior Publication Data

US 2021/0042180 A1 Feb. 11, 2021

(51) Int. Cl.
*G06F 11/00* (2006.01)
*G06F 11/07* (2006.01)
*G06N 5/04* (2006.01)
*G06F 16/21* (2019.01)
*G06N 20/00* (2019.01)
*G06N 3/08* (2006.01)
(Continued)

(52) U.S. Cl.
CPC ........ *G06F 11/0793* (2013.01); *G06F 11/079* (2013.01); *G06F 11/0727* (2013.01); *G06F 16/217* (2019.01); *G06N 5/04* (2013.01); *G06N 20/00* (2019.01); *G06N 3/006* (2013.01); *G06N 3/08* (2013.01); *G06N 5/048* (2013.01); *G06N 20/10* (2019.01)

(58) Field of Classification Search
CPC ............. G06F 11/0793; G06F 11/0727; G06F 11/079; G06F 16/217; G06F 11/0781; G06F 11/3447; G06F 11/3452; G06F 11/3442; G06F 2201/20; G06N 5/04; G06N 5/048; G06N 3/006; G06N 3/08; G06N 20/00; G06N 20/10; H02J 50/12; H02J 50/80; H02J 7/0042; H02J 7/02
USPC ....................................................... 714/1–57
See application file for complete search history.

(56) References Cited

U.S. PATENT DOCUMENTS 7,561,991 B2 * 7/2009 Matsunaga ............. G06F 17/18 703/2
7,788,536 B1 * 8/2010 Qureshi ................. G06F 11/079 714/38.14

(Continued)

*Primary Examiner* — Sarai E Butler
(74) *Attorney, Agent, or Firm* — Invoke

(57) ABSTRACT

Techniques for predictive system remediation are disclosed. Based on attributes associated with applications of one or more system-selected remedial actions to one or more problematic system behaviors in a system (e.g., a database system), the system determines a predicted effectiveness of one or more future applications of a remedial action to a particular problematic system behavior, as of one or more future times. The system determines that the predicted effectiveness of the one or more future applications of the remedial action is positive but does not satisfy a performance criterion. Responsive to determining that the predicted effectiveness is positive but does not satisfy the performance criterion, the system generates a notification corresponding to the predicted effectiveness not satisfying the performance criterion. The system applies the remedial action to the particular problematic system behavior, despite already determining that the predicted effectiveness does not satisfy the one or more performance criteria.

26 Claims, 5 Drawing Sheets

(51) Int. Cl.
*G06N 3/00* (2006.01)
*G06N 20/10* (2019.01)

(56) References Cited

U.S. PATENT DOCUMENTS

| | | | | |
|---|---|---|---|---|
| 2002/0091972 A1* | 7/2002 | Harris | G06F 11/008 | 714/47.2 |
| 2004/0153823 A1* | 8/2004 | Ansari | G06F 11/0715 | 714/38.14 |
| 2008/0172574 A1* | 7/2008 | Fisher | G06Q 10/10 | 714/25 |
| 2010/0241891 A1* | 9/2010 | Beasley | G06F 11/079 | 714/1 |
| 2010/0299562 A1* | 11/2010 | Williams | G06F 9/3808 | 714/37 |
| 2011/0276836 A1* | 11/2011 | Kahana | G06F 11/3476 | 714/38.1 |
| 2012/0297251 A1* | 11/2012 | Masser | G06F 11/3688 | 714/37 |
| 2015/0135012 A1* | 5/2015 | Bhalla | H04L 41/0631 | 714/26 |
| 2015/0149393 A1* | 5/2015 | Hwang | G06N 20/00 | 706/12 |
| 2015/0370625 A1* | 12/2015 | Nakajima | G06F 11/0709 | 714/37 |
| 2016/0011942 A1* | 1/2016 | Golbourn | G06F 11/1088 | 714/6.3 |
| 2016/0085641 A1* | 3/2016 | Nagasubramaniam | H04L 41/0654 | 714/4.11 |
| 2016/0246667 A1* | 8/2016 | Kumar Rao | G06Q 10/06 | |
| 2019/0197396 A1* | 6/2019 | Rajkumar | G06N 3/08 | |
| 2020/0226401 A1* | 7/2020 | Rajagopal | G06N 7/005 | |
| 2020/0394462 A1* | 12/2020 | Hild | G06N 20/00 | |
| 2020/0409825 A1* | 12/2020 | Balasubramanian | G06F 16/90335 | |

* cited by examiner

PREDICTIVE SYSTEM REMEDIATION

TECHNICAL FIELD

The present disclosure relates to managing systems of computer hardware and/or software running on hardware.

BACKGROUND

Systems of computer hardware and/or software running on hardware (hereafter "computer systems," for example, database systems, virtual machines, clusters, distributed systems, and/or other kinds of computer systems or combinations thereof) are subject to various kinds of problematic system behaviors. In general, a problematic system behavior is any kind of behavior that affects access to the computer system and/or services supported by the computer system, data integrity of data stored by the computer system, responsiveness of the computer system, and/or any other performance characteristic of the computer system or combination thereof. A non-problematic system behavior corresponds to a system state in which the component(s) in question is/are functioning as intended. A problematic system behavior indicates that one or more components of the computer system are in a degraded and/or non-functional state, for example, due to changing or unexpected demands on the computer system, or changing or unexpected interactions among the components of the computer system. For example, a problematic system behavior may indicate that one or more components of the computer system have failed, display symptoms of impending failure, and/or are not performing to expectations. Examples of problematic system behaviors may include, but are not limited to: bandwidth saturation; slow response time; high processor utilization; low storage space (e.g., disk space) availability; an abnormally high rate of requests and/or transactions per time unit (e.g., per second); slow processing time per transaction; abnormally long times spent in wait states (e.g., input/output wait times, processor wait times, etc.); and/or any other kind of system behavior that can be qualified or quantified as problematic, or any combination thereof.

Various remedial actions are available to address problematic system behavior. Examples of remedial actions include allocating more resources, applying software patches, clearing a cache, or restarting the computer system. In some cases, applying a remedial action may resolve a problematic system behavior only temporarily. The problematic system behavior may return in the future. If the problematic system behavior worsens over time, an applicable remedial action may become correspondingly less effective over time.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. PREDICTIVE SYSTEM REMEDIATION
4. ILLUSTRATIVE EXAMPLE
5. MISCELLANEOUS; EXTENSIONS
6. HARDWARE OVERVIEW
7. COMPUTER NETWORKS AND CLOUD NETWORKS
8. MICROSERVICE APPLICATIONS

1. General Overview

One or more embodiments include techniques for predictive system remediation. Based on attributes associated with applications of one or more system-selected remedial actions to one or more problematic system behaviors in a system (e.g., a database system), the system determines a predicted effectiveness of one or more future applications of a remedial action to a particular problematic system behavior, as of one or more future times. The system determines that the predicted effectiveness of the one or more future applications of the remedial action is positive but does not satisfy one or more performance criteria. Responsive to determining that the predicted effectiveness is positive but does not satisfy the one or more performance criteria, the system generates a notification corresponding to the predicted effectiveness not satisfying the one or more performance criteria. The system applies the remedial action to the particular problematic system behavior, despite already determining that the predicted effectiveness of the one or more future applications of the remedial action does not satisfy the one or more performance criteria.

One or more embodiments described in this Specification and/or recited in the claims may not be included in this General Overview section.

2. Architectural Overview

Figure 1:
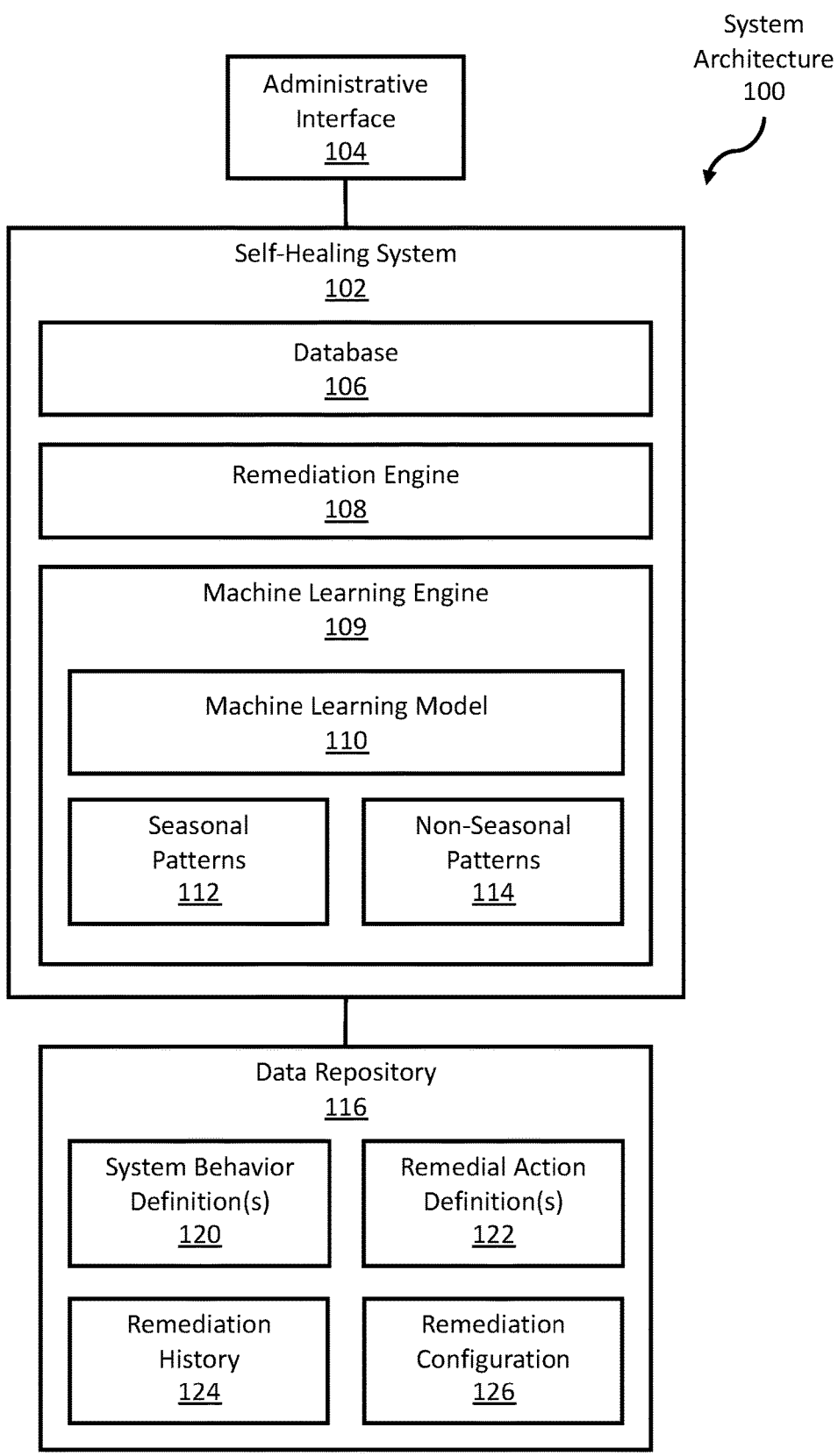
FIG. 1 illustrates a system in accordance with one or more embodiments.

FIG. 1 illustrates a system 100 in accordance with one or more embodiments. As illustrated in FIG. 1, system 100 includes an administrative interface 104, a self-healing system 102, a data repository 116, and various components thereof. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below.

In an embodiment, administrative interface 104 refers to hardware and/or software configured to facilitate communications between a user (e.g., a user in an administrative role and/or who performs administrative functions) and a self-healing system 102. Administrative interface 104 renders user interface elements and receives input via user interface elements. Examples of interfaces include a graphical user interface (GUI), a command line interface (CLI), a haptic interface, and a voice command interface. Examples of user interface elements include checkboxes, radio buttons, drop-down lists, list boxes, buttons, toggles, text fields, date and time selectors, command lines, sliders, pages, and forms.

In an embodiment, different components of administrative interface 104 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, administrative interface 104 is specified in one or more other languages, such as Java, C, or C++.

In an embodiment, self-healing system 102 refers to hardware and/or software configured to perform operations described herein for predictive system remediation. Examples of operations for predictive system remediation are described below. The self-healing system 102 is configured to 'self-heal' by detecting one or more problematic system behaviors and applying one or more system-selected remedial actions to the problematic system behavior(s), without requiring intervening user input to select and/or initiate the remedial action(s). The self-healing system 102 may be a self-healing database system that includes a database 106. The self-healing system 102 may be configured to detect problematic system behaviors that affect the database 106 and apply one or more system-selected remedial actions to 'heal' the database.

In an embodiment, a problematic system behavior may be any kind of behavior that affects access to the self-healing system 102, data integrity of data stored by the self-healing system 102, responsiveness of the self-healing system, and/or any other performance characteristic of the self-healing system 102 or combination thereof. A problematic system behavior may be associated with one or more system metrics, where different values of the metric(s) correspond to different system states, ranging from non-problematic system behaviors to problematic system behaviors. For example, the self-healing system 102 may track metrics corresponding to bandwidth usage, response times, processor utilization, storage availability, transaction rates, processing times, wait times, and/or any other kind of metric or combination thereof that quantifies a system behavior. A non-problematic system behavior corresponds to a system state in which the component(s) in question is/are functioning as intended. A problematic system behavior indicates that one or more components of the self-healing system 102 are in a degraded and/or non-functional state. For example, a problematic system behavior may indicate that one or more components of the self-healing system have failed, display symptoms of impending failure, and/or are not performing to expectations. Examples of problematic system behaviors may include, but are not limited to: bandwidth saturation; slow response time; high processor utilization; low storage space (e.g., disk space) availability; an abnormally high rate of requests and/or transactions per time unit (e.g., per second); slow processing time per transaction; abnormally long times spent in wait states (e.g., input/output wait times, processor wait times, etc.); and/or any other kind of problematic system behavior or combination thereof.

In an embodiment, a remedial action may be any kind of action or combination thereof designed to remediate one or more problematic system behaviors. A remedial action may restart or reset a component of the self-healing system 102 (e.g., a database, a service, a virtual machine, an operating system, and/or any other component of the self-healing system 102 or combination thereof). Alternatively or additionally, a remedial action may provision additional resources (e.g., network bandwidth, processor cycles, memory, storage, and/or any other kind of resource or combination thereof) for the self-healing system 102. For example, the self-healing system 102 may operate in a data center, a virtual machine environment, and/or any other kind of operating environment in which available resources are allocated between multiple physical and/or virtual systems. A remedial action may allocate free resources and/or reallocate resources from another system to the self-healing system 102. Alternatively or additionally, a remedial action may reconfigure one or more components of the self-healing system. For example, if a network interface is saturated, a remedial action may impose a data rate limit on transactions conducted over that network interface. Many different kinds of remedial actions and/or combinations thereof may be applied to many different kinds of problematic system behaviors.

In an embodiment, a remediation engine 108 refers to hardware and/or software configured to perform operations described herein for detecting a problematic system behavior, selecting a remedial action to apply to a problematic system behavior, and/or applying a remedial action to a problematic system behavior. The remediation engine 108 may be configured to monitor components of the self-healing system 102 (e.g., using polling, logging agents, a heartbeat system in which components periodically report their health status, and/or any other kind of monitoring or combination thereof). Based on the monitoring, the remediation engine 108 may detect a problematic system behavior. Responsive to detecting a problematic system behavior, the remediation engine 108 may select from a set of available remedial actions, which may have been designated as applicable to one or more particular problematic system behaviors. The remediation engine 108 may apply a system-selected remedial action to the problematic system behavior.

In an embodiment, a remediation engine 108 is configured to predict the future effectiveness of one or more remedial actions for resolving one or more problematic system behaviors. Specifically, the remediation engine 108 may use information about prior applications of remedial actions to problematic system behaviors to predict future effectiveness of remedial actions. The remediation engine 108 may use information store in a data repository 116, described below.

In an embodiment, the self-healing system 102 includes a machine learning engine 109. Machine learning includes various techniques in the field of artificial intelligence that deal with computer-implemented, user-independent processes for solving problems that have variable inputs. The self-healing system 102 may be configured to use the machine learning engine 109 to perform one or more operations, described herein, to predict future effectiveness of one or more remedial actions.

In embodiment, the machine learning engine 109 trains a machine learning model 110 to perform one or more operations. Training a machine learning model 110 uses training data to generate a function that, given one or more inputs to the machine learning model, computes a corresponding output. The output may correspond to a prediction based on prior machine learning. In an embodiment, the output includes a label, classification, and/or categorization assigned to the provided input(s). The machine learning model 110 corresponds to a learned model for performing the desired operation(s) (e.g., labeling, classifying, and/or categorizing inputs).

In an embodiment, the machine learning engine 109 may use supervised learning, semi-supervised learning, unsupervised learning, reinforcement learning, and/or another training method or combination thereof. In supervised learning, labeled training data includes input/output pairs in which each input is labeled with a desired output (e.g., a label, classification, and/or categorization), also referred to as a supervisory signal. In semi-supervised learning, some inputs are associated with supervisory signals and other inputs are not associated with supervisory signals. In unsupervised learning, the training data does not include supervisory signals. Reinforcement learning uses a feedback system in which the machine learning engine 109 receives positive and/or negative reinforcement in the process of attempting to solve a particular problem (e.g., to optimize performance in a particular scenario, according to one or more predefined performance criteria). In an embodiment, the machine learning engine 109 initially uses supervised learning to train the machine learning model 110 and then uses unsupervised learning to update the machine learning model 110 on an ongoing basis.

In an embodiment, a machine learning engine 109 may use many different techniques to label, classify, and/or categorize inputs. A machine learning engine 109 may transform inputs into feature vectors that describe one or more properties ("features") of the inputs. The machine learning engine 109 may label, classify, and/or categorize the inputs based on the feature vectors. Alternatively or additionally, a machine learning engine 109 may use clustering (also referred to as cluster analysis) to identify commonalities in the inputs. The machine learning engine 109 may group (i.e., cluster) the inputs based on those commonalities. The machine learning engine 109 may use hierarchical clustering, k-means clustering, and/or another clustering method or combination thereof. In an embodiment, a machine learning engine 109 includes an artificial neural network. An artificial neural network includes multiple nodes (also referred to as artificial neurons) and edges between nodes. Edges may be associated with corresponding weights that represent the strengths of connections between nodes, which the machine learning engine 109 adjusts as machine learning proceeds. Alternatively or additionally, a machine learning engine 109 may include a support vector machine. A support vector machine represents inputs as vectors. The machine learning engine 109 may label, classify, and/or categorizes inputs based on the vectors. Alternatively or additionally, the machine learning engine 109 may use a naïve Bayes classifier to label, classify, and/or categorize inputs. Alternatively or additionally, given a particular input, a machine learning model may apply a decision tree to predict an output for the given input. Alternatively or additionally, a machine learning engine 109 may apply fuzzy logic in situations where labeling, classifying, and/or categorizing an input among a fixed set of mutually exclusive options is impossible or impractical. The aforementioned machine learning model 110 and techniques are discussed for exemplary purposes only and should not be construed as limiting one or more embodiments.

In an embodiment, as a machine learning engine 109 applies different inputs to a machine learning model 110, the corresponding outputs are not always accurate. As an example, the machine learning engine 109 may use supervised learning to train a machine learning model 110. After training the machine learning model 110, if a subsequent input is identical to an input that was included in labeled training data and the output is identical to the supervisory signal in the training data, then output is certain to be accurate. If an input is different from inputs that were included in labeled training data, then the machine learning engine 109 may generate a corresponding output that is inaccurate or of uncertain accuracy. In addition to producing a particular output for a given input, the machine learning engine 109 may be configured to produce an indicator representing a confidence (or lack thereof) in the accuracy of the output. A confidence indicator may include a numeric score, a Boolean value, and/or any other kind of indicator that corresponds to a confidence (or lack thereof) in the accuracy of the output.

In an embodiment, given a problematic system behavior and a candidate remedial action, a machine learning engine 109 may be configured to predict future effectiveness of the candidate remedial action for resolving the problematic system behavior. The machine learning engine 109 may be configured to detect and store patterns in system behaviors and/or prior applications of remedial actions to problematic system behaviors. The machine learning engine 109 may be configured to predict future system behaviors and/or effectiveness of remedial actions, based on those patterns.

In an embodiment, the machine learning engine 109 is configured to detect and store seasonal patterns 112. Seasonal patterns 112 are patterns of system behaviors associated with particular seasons, i.e., periods of time during which system behaviors may vary in relatively predictable ways due to seasonal factors. For example, holidays and sales events typically are associated with seasonal system behaviors. Seasonality is discussed in further detail in U.S. patent application Ser. No. 15/186,938, incorporated herein by reference in its entirely.

In an embodiment, the machine learning engine 109 is configured to detect and store non-seasonal patterns 114. Non-seasonal patterns 114 are patterns of system behaviors that are not associated with particular seasons. A non-seasonal pattern 114 may correspond to a trend in a system behavior (for example, increasing wait times) over time. Alternatively or additionally, a non-seasonal pattern 114 may correspond to a cyclical pattern in system behavior (for example, moving between long wait times and short wait times according to a discernable pattern) over time. Alternatively or additionally, seasonal patterns 112 and/or non-seasonal patterns 114 may reflect patterns of system behaviors when remedial actions are applied to resolve problematic system behaviors. Seasonal patterns 112 and/or non-seasonal patterns 114 may be based on information stored in a data repository 116, described below. In general, in an embodiment, the machine learning engine 109 uses seasonal patterns 112 and/or non-seasonal patterns 114 to predict future system behaviors In an embodiment, the machine learning engine 109 is configured to account for seasonal patterns 112 and/or non-seasonal patterns 114 when predicting future system behaviors and/or the future effectiveness of applying a remedial action to a problematic system behavior. Predicting future system behaviors and/or future effectiveness of applying a remedial action to a problematic system behavior is discussed in further detail below.

In an embodiment, the system 100 includes a data repository 116. A data repository 116 may be configured to store one or more system behavior definitions 120. A system behavior definition 120 corresponds to a system behavior to be treated as a problematic system behavior or a non-problematic system behavior. The system behavior definition 120 may include data that indicates a kind of system behavior (e.g., processor utilization) and/or a particular system resource (e.g., a particular network interface). Alternatively or additionally, a system behavior definition 120 may include a threshold metric (e.g., a maximum processor utilization, a minimum amount of free storage space, etc.), at or beyond which the corresponding system behavior is considered problematic. In an embodiment, whether or not a particular system behavior is considered 'problematic' is based, at least in part, on seasonal patterns 112 of system behavior. For example, a system behavior (e.g., high processor usage, a high request rate, high bandwidth saturation, etc.) that may be considered problematic during a non-peak season may be considered non-problematic during a peak season (e.g., during a promotion or holiday season). One or more system behavior definitions 120 may include different criteria for different seasons and/or kinds of seasons.

Alternatively or additionally, a data repository 116 may be configured to store one or more remedial action definitions 122. A remedial action definition 122 corresponds to behavior that is selectable by the self-healing system to attempt to remediate a problematic system behavior (e.g., as defined by a system behavior definition 120). A remedial action definition 122 may include data that indicates a kind of system behavior (e.g., high processor utilization) to which the remedial action corresponding to the remedial action definition 122 applies. The remedial action definition 122 may indicate the applicable system behavior by mapping the remedial action definition 122 to a corresponding system behavior definition 120 (e.g., by including a unique identifier of the system behavior definition 120 in the remedial action definition 122, or by some other technique for mapping a remedial action definition 122 to a system behavior definition 120). Alternatively or additionally, a remedial action definition 122 may indicate the remedial action(s) to be applied. Examples of remedial actions are described above.

Alternatively or additionally, a data repository 116 may be configured to store a remediation history 124. A remediation history 124 includes data corresponding to prior application(s) of one or more remedial actions to one or more problematic system behaviors. The data may include attributes associated with the application(s). For example, an attribute may indicate: a time when a remedial action was applied; a metric associated with the problematic system behavior before the remedial action was applied; a metric associated with the problematic system behavior after the remedial action was applied; a data value indicating whether the application of the remedial action was successful in remediating the problematic system behavior; and/or any other kind of information associated with one or more applications of one or more remedial actions to one or more problematic system behaviors.

Alternatively or additionally, a data repository 116 may be configured to store a remediation configuration 126. A remediation configuration 126 indicates one or more criteria for applying a remedial action to a problematic system behavior. A criterion for applying a remedial action to a problematic system behavior may be different from a threshold metric indicating that the corresponding system behavior is considered problematic. For example, the criterion may indicate that the remedial action should be applied only when the system behavior has been problematic for at least a certain amount of time, or by a certain amount (e.g., a certain amount or percentage above or below the threshold metric). Alternatively or additionally, a remediation configuration 126 may indicate an order of preference for different remedial actions, times of day when remedial actions may be applied (e.g., restarting the self-healing system 102 only during off-peak hours), a maximum number of times to attempt a particular remedial action, and/or any other criterion or combination thereof for applying a remedial action to a problematic system behavior.

In an embodiment, a system behavior definition 120, remedial action definition 122, remediation configuration 126, and/or other storage item or combination thereof may include one or more performance criteria for a remedial action, corresponding to whether or not the remedial action is considered successful. One or more performance criteria for a remedial action may correspond to a relative improvement for a system behavior or an expected value of that system behavior at some time in the future or within a certain time window into the future. For example, one or more performance criteria may indicate that a remedial action directed to processor utilization is 'successful' if the remedial action is expected to reduce processor utilization by at least a certain percentage from a current processor utilization level, optionally for a certain time window into the future. As another example, one or more performance criteria may indicate that a remedial action directed to storage space is 'successful' if the remedial action is expected to free up at least a certain percentage of currently utilized storage space, optionally for a certain time window into the future. As yet another example, one or more performance criteria may indicate that a remedial action is 'successful' if the system is not predicted to crash or enter a critical operational state that is user-defined (for example, based on the experience, wisdom, or risk-averseness of a system administrator) and/or associated with loads that have been elevated to levels that severely degrade performance (for example, to the point of preventing actual or virtual users of the computer system from obtaining benefits offered or even guaranteed by the computer system, or to the point of costing an owner of the computer system an amount of resources that is unacceptably large in comparison to the purpose and accepted costs of the computer system), optionally for a certain time window into the future (e.g., for the next thirty days). In this example, as long as the system is not expected to enter that critical operational state within the specified time window into the future, the remedial action is successful at delaying any real need to provide a more tailored solution to the underlying problem. Alternatively or additionally, one or more performance criteria for a remedial action may correspond to an absolute metric. For example, one or more performance criteria may indicate that a remedial action directed to processor utilization is 'successful' if the remedial action is expected to reduce processor utilization below a certain amount (e.g., fifty percent utilization), optionally for a certain time window into the future. As another example, one or more performance criteria may indicate that a remedial action directed to storage space is 'successful' if the remedial action is expected to result in at least a certain amount of storage space (e.g., one terabyte), optionally for a certain time window into the future. Many different kinds of performance criteria and/or combinations thereof may be used to define 'success' for a remedial action.

In an embodiment, a data repository 116 is any type of storage unit and/or device (e.g., a file system, database, collection of tables, or any other storage mechanism) for storing data. Further, a data repository 116 may include multiple different storage units and/or devices. The multiple different storage units and/or devices may or may not be of the same type or located at the same physical site. Further, a data repository 116 may be implemented or may execute on the same computing system as one or more other components of the system 100. Alternatively or additionally, a data repository 116 may be implemented or executed on a computing system separate from one or more other components of the system 100. A data repository 116 may be communicatively coupled to one or more other components of the system 100 via a direct connection or via a network.

Information describing system behavior definitions 120, remedial action definitions 122, a remediation history 124, and/or a remediation configuration 126 may be implemented across any of components within the system 100. However, this information is illustrated within the data repository 116 for purposes of clarity and explanation.

In an embodiment, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Predictive System Remediation

Figure 2A:
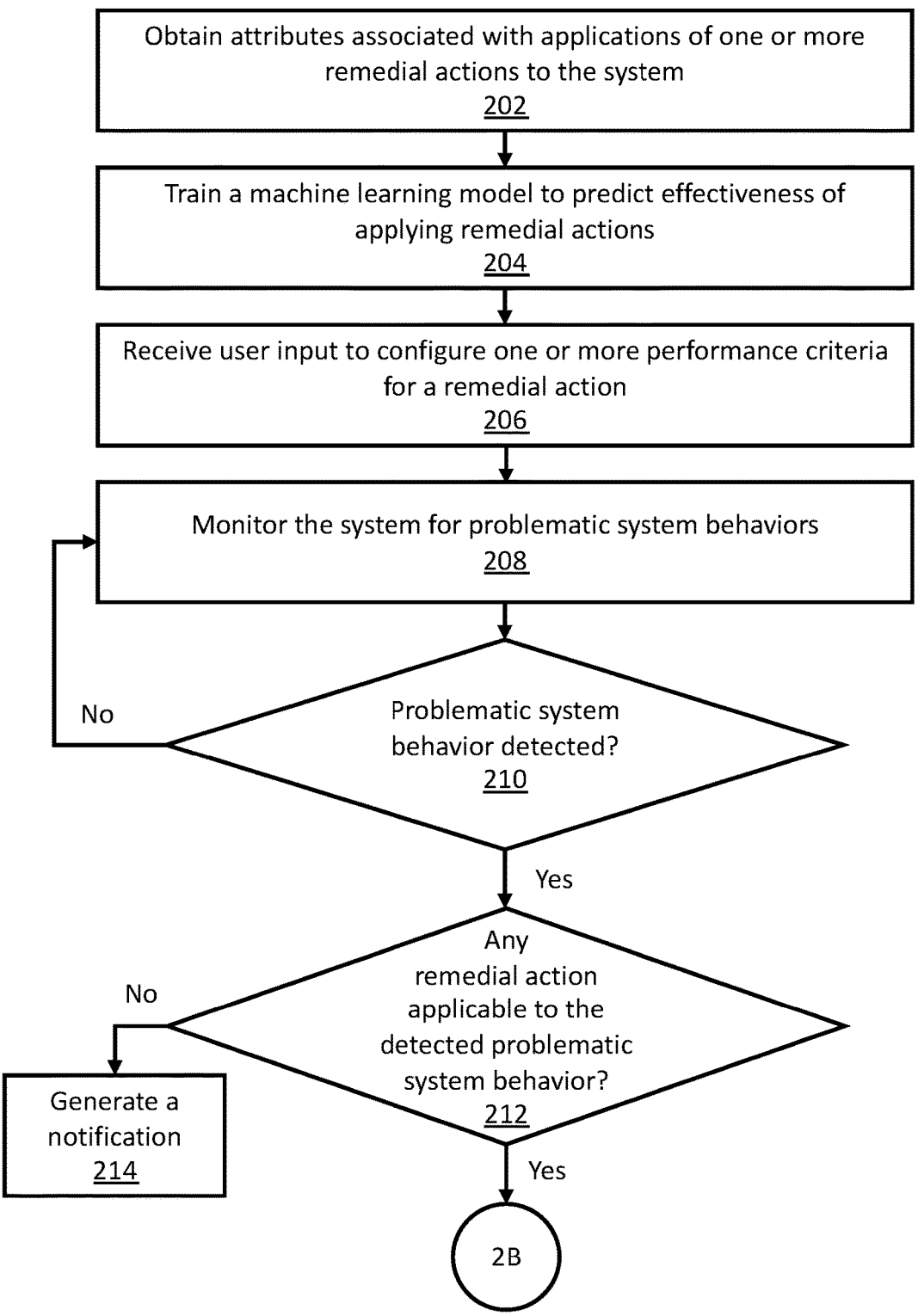
FIGS. 2A-2B illustrate a set of operations for predictive system remediation in accordance with one or more embodiments.
Figure 2B:
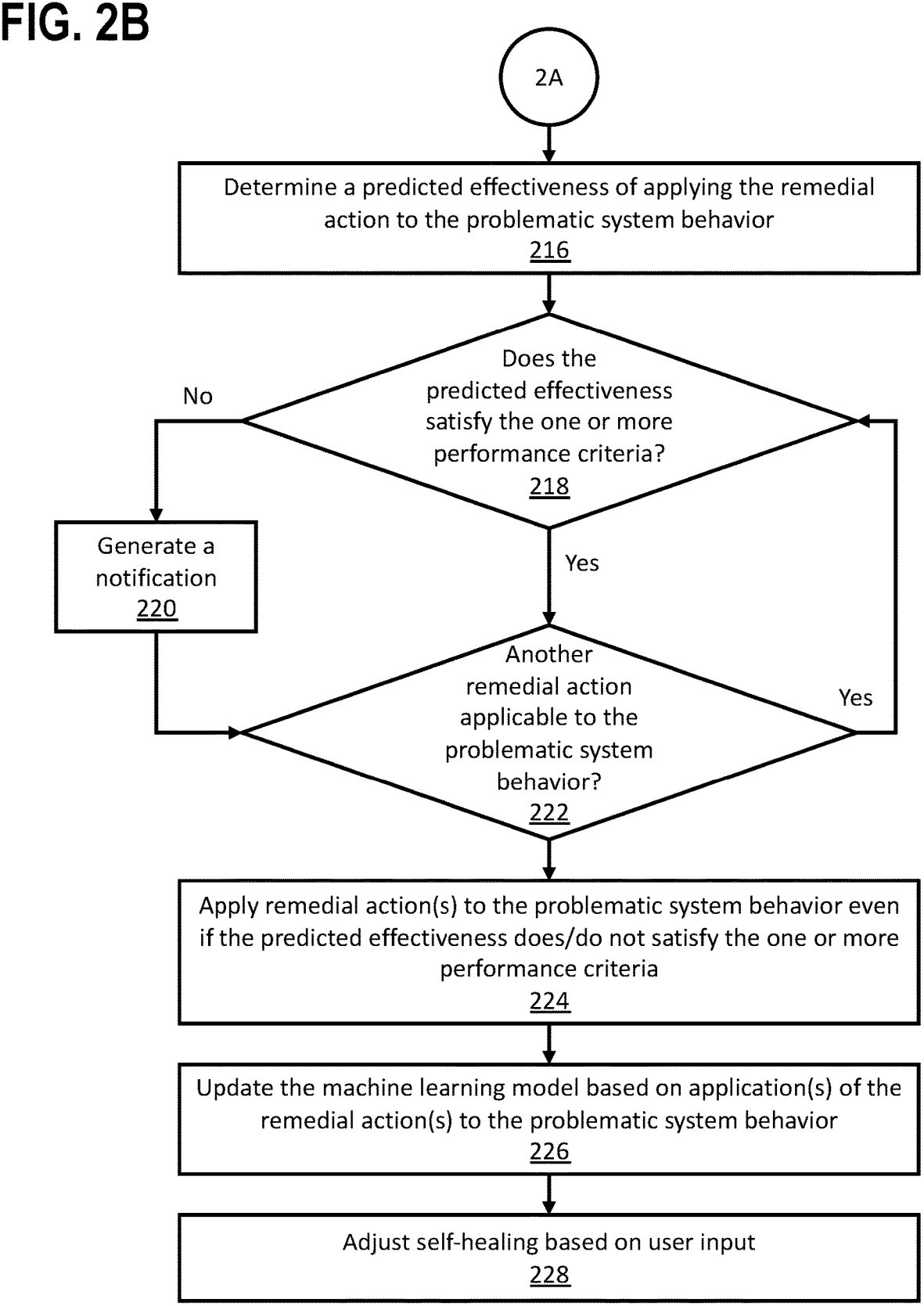

FIGS. 2A-2B illustrate an example set of operations for predictive system remediation in accordance with one or more embodiments. One or more operations illustrated in FIGS. 2A-2B may be modified, rearranged, or omitted all together. Accordingly, the particular sequence of operations illustrated in FIGS. 2A-2B should not be construed as limiting the scope of one or more embodiments.

In an embodiment, a system (e.g., self-healing system 102 of FIG. 1) obtains attributes associated with applications of one or more remedial actions to the system (Operation 202). As discussed above, the attributes may include any kind of information associated with prior applications of the remedial action(s), including but not limited to: a time when a remedial action was applied; a metric associated with the problematic system behavior before the remedial action was applied; a metric associated with the problematic system behavior after the remedial action was applied; a data value indicating whether the application of the remedial action was successful in remediating the problematic system behavior; and/or any other kind of information associated with one or more applications of one or more remedial actions to one or more problematic system behaviors. The attributes may include labeled training data specifically designed and loaded into the system to train a machine learning model. Alternatively or additionally, the attributes may include unlabeled data obtained during system operation.

In an embodiment, the system trains a machine learning model to predict effectiveness of applying remedial actions (Operation 204). As discussed above, the system may train the machine learning model using supervised learning, unsupervised learning, reinforcement learning, and/or another training method or combination thereof. The system may use labeled and/or unlabeled data (e.g., attributes associated with applications of one or more remedial actions to the system) to train the machine learning model.

In an embodiment, the system receives user input to configure one or more performance criteria for a remedial action (Operation 206). As discussed above, the one or more performance criteria for a remedial action, when compared with a particular instance of applying the remedial action, indicate whether or not the remedial action is considered successful. In an embodiment, the one or more performance criteria include one or more user-defined criteria that the system receives via a user interface (e.g., administrative interface 104 of FIG. 1).

In an embodiment, the system monitors for problematic system behaviors (Operation 208). The system may monitor for problematic system behaviors by obtaining data associated with current system behaviors (e.g., using one or more monitoring techniques described above). Based on the data associated with current system behaviors, the system determines whether a problematic system behavior is detected (Operation 210). In an embodiment, whether or not a particular system behavior is considered 'problematic' is based, at least in part, on seasonal patterns of system behavior. A system behavior (e.g., high processor usage, a high request rate, high bandwidth saturation, etc.) that may be considered problematic during a non-peak season may be considered non-problematic during a peak season (e.g., during a promotion or holiday season). The system may predict that such behaviors that arise during a peak season will subside and/or self-rectify at the end of the season and therefore do not require remedial action. Whether or not a system behavior is considered problematic may be evaluated against one or more system behavior definitions (e.g., system behavior definition 120 of FIG. 1). Different criteria may apply to different seasons and/or kinds of seasons. In general, in an embodiment, the system monitors for system behaviors that are problematic because they deviate sufficiently (e.g., by a defined amount or degree, such as a certain number of standard deviations) and persistently from expected system behavior.

In an embodiment, responsive to determining that a problematic system behavior is detected, the system determines whether any remedial action applicable to the detected problematic system behavior is available (Operation 212). Specifically, the system may determine whether any remedial action definition (e.g., remedial action definition 122 of FIG. 1) maps to the particular problematic system behavior and/or kind of problematic system behavior detected. If no remedial action applicable to the detected problematic system behavior is available, the system may generate a notification (Operation 214) indicating that the system is unable to 'self-heal.' The system may log the notification and/or transmit the notification to a user (e.g., a system administrator).

In an embodiment, responsive to determining that a remedial action applicable to the detected problematic system behavior is available, the system determines a predicted effectiveness of applying the remedial action to the problematic system behavior (Operation 216). The system may determine a predicted effectiveness of applying the remedial action to a currently manifested instance of the problematic system behavior. Alternatively, the system may determine a predicted effectiveness of applying the remedial action to one or more future instances of the problematic system behavior. In some cases, applying a remedial action may resolve the problematic system behavior temporarily. However, the problematic system behavior may arise again, and the remedial action may be less successful in subsequent applications. For example, the remedial action may become decreasingly effective over time.

In an embodiment, the system uses a machine learning model (e.g., machine learning model 110 of FIG. 1) to determine the predicted effectiveness of applying the remedial action to the problematic system behavior. The predicted effectiveness may include information about when the remedial action is predicted to no longer be effective (e.g., after a certain amount of time and/or a certain number of instances of the problematic system behavior). The predicted effectiveness may correspond to a metric that indicates an amount or degree to which the remedial action is successful and/or unsuccessful. The system may determine the predicted effectiveness before applying the remedial action to a current instance of the problematic system behavior. Alternatively or additionally, the system may determine the predicted effectiveness of a remedial action preemptively, to determine whether the system has any vulnerabilities to problematic system behaviors that are not currently manifested in the system.

In an embodiment, the system determines whether the predicted effectiveness of applying the remedial action satisfies one or more performance criteria (Operation 218) that, when compared with a particular instance of applying the remedial action, indicate whether or not the remedial action is considered successful. If the predicted effectiveness does not satisfy the one or more performance criteria or otherwise indicates that the remedial action is predicted to be unsuccessful, the system may generate a notification (Operation 220). The notification may include any kind of information associated with the system's prediction, such as: the problematic system behavior; the remedial action; the predicted effectiveness; a timeframe in which the remedial action is predicted to fail the one or more performance criteria; and/or any other kind of information or combination thereof associated with the system's prediction. The system may log the notification and/or transmit the notification to a user (e.g., a system administrator). In an embodiment, the system is configured to transmit the notification within a certain amount of time before the remedial action is predicted to fail to satisfy the one or more performance criteria (e.g., within a week, a month, or any other period of time which may by user-configured), to allow sufficient time for a user to intervene and prevent the predicted failure. The amount of time may be based, at least in part, on an expected amount of time for a user to troubleshoot and/or resolve a problematic system behavior. The amount of time may be user-configurable, for example via a user interface that includes controls for managing the system's self-healing behavior as described herein. In an embodiment, the notification includes a link (e.g., a hyperlink, application launcher, and/or another kind of link) that, when selected by a user, directs the user to a graphical user interface that includes controls for managing the system's self-healing behavior. Alternatively or additionally, the notification itself may include a graphical user interface with such controls. Some examples of user input corresponding to instructions to manage self-healing behavior are discussed below.

In an embodiment, the system determines whether another remedial action is applicable to the problematic system behavior (Operation 222). The system may predict the effectiveness of applying each remedial action that is applicable to the problematic system behavior.

In an embodiment, even if the predicted effectiveness of applying a remedial action (or multiple remedial actions, if applicable) does not satisfy the one or more performance criteria, or the remedial action is otherwise predicted to be unsuccessful, the system nonetheless applies the remedial action to a current instance of the problematic system behavior (Operation 224). As discussed above, applying the remedial action may remediate and/or improve the problematic system behavior temporarily. The system may continue applying the remedial action to instances of the problematic system behavior, performing 'self-healing' to the best of the system's ability, until further action is taken to address the problematic system behavior. Applying the remedial action, despite the predicted effectiveness not satisfying the one or more performance criteria, may allow the system to continue applying the remedial action during a period of time and/or for instances of the problematic system behavior for which the remedial action still satisfies the one or more performance criteria. The system may continue to apply the remedial action before reaching a point in time and/or instance of the problematic system behavior for which the remedial action's effectiveness fails to satisfy the one or more performance criteria.

In an embodiment, the system applies multiple remedial actions to a problematic system behavior. The system may apply the remedial actions in a particular order. For example, the system may apply the remedial actions in order of predicted effectiveness, predicted cost to an entity that operates the system, complexity (e.g., attempting to allocate more resources before applying a software patch, or clearing a cache before allocating more resources), or any other ordering criterion or combination thereof. Alternatively or additionally, the system may apply remedial actions according to a defined order (e.g., a particular order designated by an administrator in the system configuration, via an administrative interface). In an embodiment, the system stores records of which remedial actions, when applied, are most effective, and gives preference to the most effective remedial actions in future instances of problematic behaviors. Alternatively or additionally, the system may track problematic secondary effects of remedial actions (e.g., system downtime when applying a software patch) and disfavor remedial actions with the most problematic secondary effects in future instances of problematic system behaviors. The system may prompt a user for confirmation before applying a remedial action that is known to have problematic secondary effects.

In an embodiment, predicting the effectiveness of applying the remedial action, before reaching a point in time and/or instance of the problematic system behavior for which the remedial action does not satisfy the one or more performance criteria, allows a system administrator to take further action (e.g., responsive to a notification from the system) to prevent the system from reaching that point in time and/or instance of the problematic system behavior. Alternatively or additionally, continuing the apply the remedial action to the problematic system behavior may continue to alleviate the problematic system behavior to some extent, even if applying the remedial action does not satisfy the one or more performance criteria.

In an embodiment, the system updates the machine learning model based on one or more applications of the remedial action(s) to the problematic system behavior (Operation 226). The system may use unsupervised learning to update the machine learning model on an ongoing basis, based on problematic system behaviors that are detected during system operation and/or outcomes of remedial actions that are applied to problematic system behaviors. Attributes associated with applications of remedial actions to problematic system behaviors may be stored as part of the system's remediation history, which the system may use to update the machine learning model. In an embodiment, updating the machine learning model on an ongoing basis improves the system's ability to predict the effectiveness of applying remedial actions to problematic system behaviors.

In an embodiment, the system adjusts self-healing based on user input (Operation 228). As noted above, a user may supply input in a graphical user interface reached via a link in a notification. A user may supply input to change a system behavior definition, a remedial action definition, remediation configuration, and/or any other kind of data or combination thereof that the system uses for self-healing. For example, the system may notify a user that a predicted effectiveness of applying a remedial action does not satisfy one or more performance criteria. Responsive to the notification, the user may instruct the system to refrain from applying the remedial action, apply the remedial action more frequently, apply a different remedial action (e.g., a remedial action, selected by the user to address the problematic system behavior, that is different from a remedial action selected by the system to address the problematic system behavior), adjust one or more performance criteria, adjust a threshold that defines a problematic system behavior, and/or make any other kind of change or combination thereof to the system's self-healing behavior. A user-selected remedial action may be selected from a set of remedial actions already defined for the system. Alternatively or additionally, a user may define and select a new remedial action, not previously defined for the system, for the system to apply if/when the problematic system behavior recurs. As another example, the system may associate different weights with different remedial actions, where the weights help the system select which remedial action to apply in a particular situation. A user may supply user input to increase or decrease the weight(s) for one or more particular remedial actions, such that the system uses the adjusted weight(s) if/when the problematic system behavior recurs. Alternatively or additionally, a user may supply input that informs the system of a problematic secondary effect (e.g., degrading performance of a system component and/or a component of another system) of a remedial action, so that the system takes the problematic secondary effect into account for future instances of a problematic system behavior. Alternatively or additionally, a user may store information about user-initiated remedial actions (as opposed to system-selected remedial actions) that may have affected system performance. For example, a user may input data corresponding to system maintenance, such as replacing a network cable, upgrading a processor, moving the system to a different geographical location, and/or any other kind of user-initiated remedial action or combination thereof that may increase or mitigate a problematic system behavior. Alternatively or additionally, a user may supply input indicating that one or more problematic system behaviors are resolved. The resolution may be of a kind that the system has not yet detected and/or is not configured to detect. Alternatively or additionally, a user may instruct the system to clear a cache, history, and/or other kind of memory associated with a machine learning engine. For example, the user may instruct the system to clear a machine learning engine's entire memory, or the machine learning engine's memory prior to a particular date. Clearing a machine learning engine's memory prior to a particular date may improve the machine learning engine's ability to make predictions by eliminating out-of-date historical data. In general, in an embodiment, the system adjusts future predictions based on the additional information supplied by the user. Adjusting self-healing based on user input may allow the system to make best efforts to self-heal, while still allowing for users to control the system's operation and make human determinations as to how the system should respond to problematic system behaviors.

4. Illustrative Example

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3:
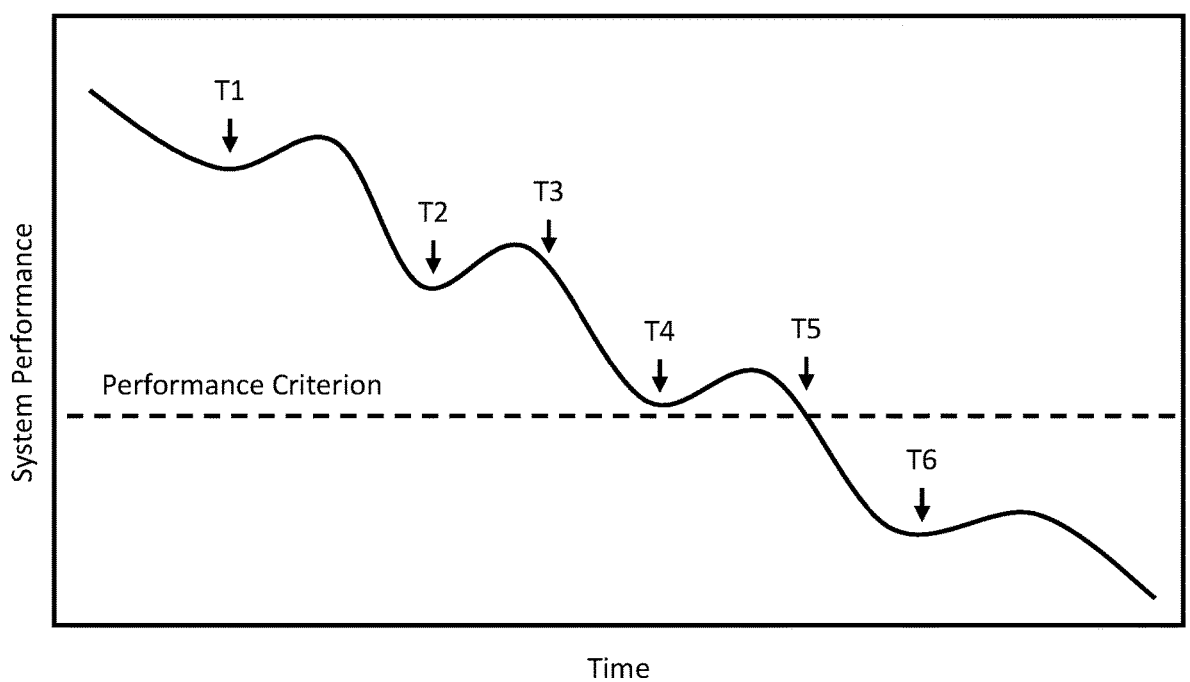
FIG. 3 illustrates an example in accordance with one or more embodiments.

FIG. 3 illustrates a graph 300 of system performance over time. In this example, the predicted effectiveness of applying a remedial action is defined with reference to system performance (e.g., available processor cycles per unit of time, available bandwidth, and/or any other kind of system performance metric or combination thereof). Specifically, the one or more performance criteria for successfully applying the remedial action correspond to restoring the system performance to a threshold level. At the start of the graph, system performance is decreasing over time. At time T1, the system applies a remedial action, resulting in the system performance improving. After time T1, the system performance is above the threshold level but does not reach its previous high. System performance subsequently starts to decrease again, and at time T2, the system applies the remedial action again. At time T3, based on the results of the applications of the remedial action at times T1 and T2, the system predicts that the effectiveness of applying the remedial action will not satisfy the one or more performance criteria (i.e., restoring system performance to at least the threshold leve) after time T5. Despite the prediction, at time T4, the system applies the remedial action again. Applying the remedial action at time T4 allows system performance to stay above the threshold level for an additional period of time. At time T5, system performance falls below the threshold level. At time T6, the system applies the remedial action again, but as predicted at time T3, the remedial action does not satisfy the one or more performance criteria, i.e., fails to restore system performance to at least the threshold level. In this example, no further action was taken to prevent system performance from falling below the threshold level at time T5, or to allow the application of the remedial action at time T6 to satisfy the one or more performance criteria. However, a system notification generated at time T3 may allow an administrator to intervene and take some further action (not shown in FIG. 3) to ensure that system performance remains above the threshold level and/or that subsequent applications of remedial actions, if needed, satisfy the one or more performance criteria.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices (i.e., computing devices specially configured to perform certain functionality). The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
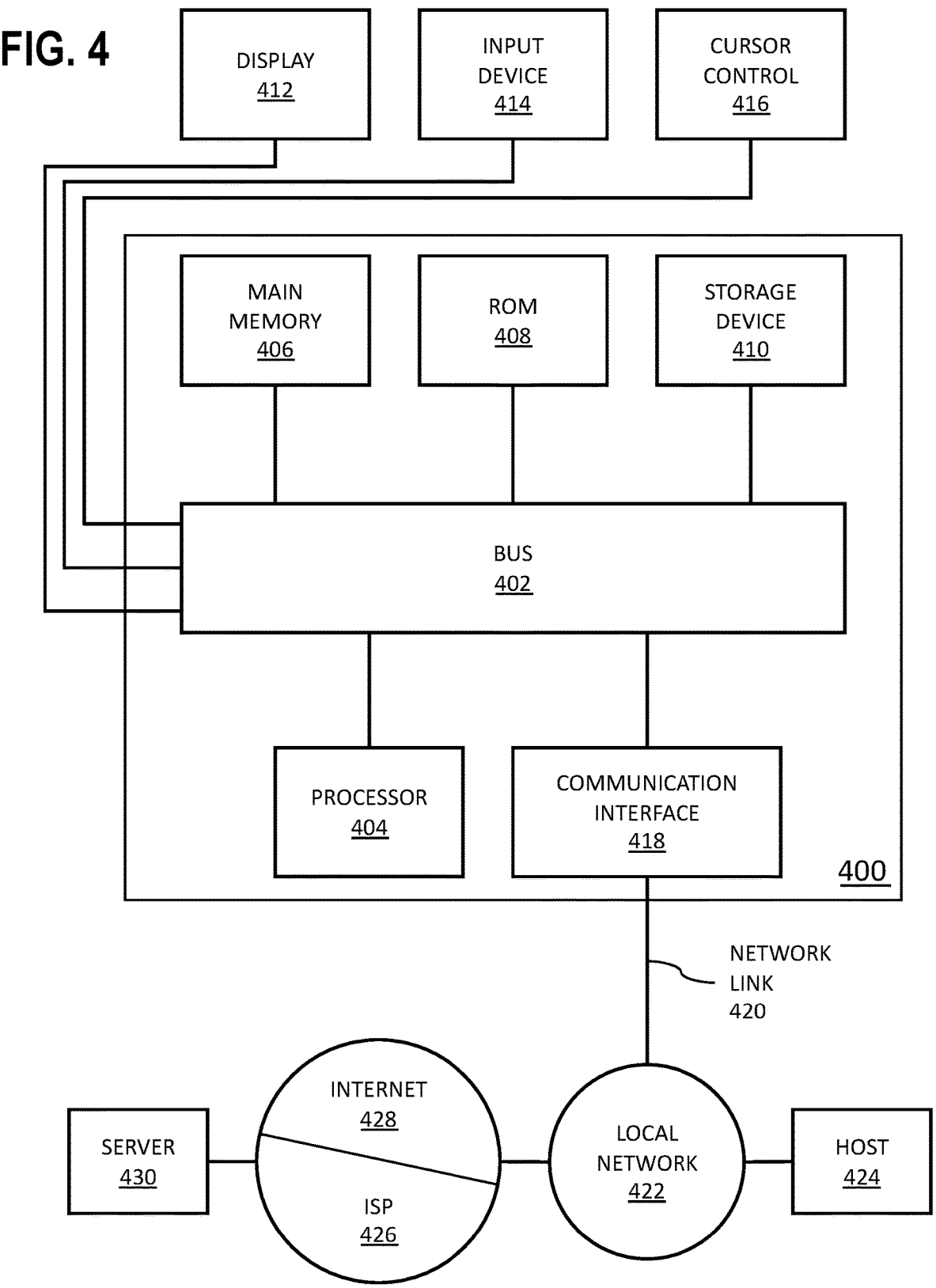
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a liquid crystal display (LCD), plasma display, electronic ink display, cathode ray tube (CRT) monitor, or any other kind of device for displaying information to a computer user. An input device 414, including alphanumeric and other keys, may be coupled to bus 402 for communicating information and command selections to processor 404. Alternatively or in addition, the computer system 400 may receive user input via a cursor control 416, such as a mouse, a trackball, a trackpad, a touchscreen, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. The display 412 may be configured to receive user input via one or more pressure-sensitive sensors, multi-touch sensors, and/or gesture sensors. Alternatively or in addition, the computer system 400 may receive user input via a microphone, video camera, and/or some other kind of user input device (not shown).

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a programmable read-only memory (PROM), and erasable PROM (EPROM), a FLASH-EPROM, non-volatile random-access memory (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a network, via a network interface controller (NIC), such as an Ethernet controller or Wi-Fi controller. A NIC local to computer system 400 can receive the data from the network and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

7. Computer Networks and Cloud Networks

In one or more embodiments, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, one tenant (through operation, tenant-specific practices, employees, and/or identification to the external world) may be separate from another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other micro services. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
    based at least on a plurality of attributes associated with a plurality of applications of one or more system-selected remedial actions to one or more problematic system behaviors in a database system: determining a first predicted effectiveness of one or more future applications of a first remedial action to a particular problematic system behavior in the database system as of one or more future times;
    determining that the first predicted effectiveness of the one or more future applications of the first remedial action is positive but does not satisfy one or more performance criteria;
    responsive to determining that the first predicted effectiveness of the one or more future applications of the first remedial action is positive but does not satisfy the one or more performance criteria:
        generating a notification corresponding to the first predicted effectiveness of the one or more future applications of the first remedial action not satisfying the one or more performance criteria;
        applying the first remedial action to the particular problematic system behavior despite already determining that the first predicted effectiveness of the one or more future applications of the first remedial action does not satisfy the one or more performance criteria.

2. The one or more media of claim 1, further storing instructions which, when executed by one or more processors, cause:
    monitoring the database system for one or more candidate problematic system behaviors;
    automatically detecting an instance of the particular problematic system behavior while monitoring the database system, without receiving any user input to identify the instance of the particular problematic system behavior;

wherein applying the first remedial action to the particular problematic system behavior is performed automatically responsive to detecting the instance of the particular problematic system behavior while monitoring the database system, without receiving any user input about the first remedial action after automatically detecting the instance of the particular problematic system behavior.

3. The one or more media of claim 2, wherein detecting the particular problematic system behavior comprises determining that a system behavior is problematic for a portion of a season in which the system behavior is detected, wherein the system behavior is determined to vary over time within a seasonal pattern that is determined to repeat over time.

4. The one or more media of claim 1, further storing instruction which, when executed by one or more processors, cause:
monitoring the plurality of applications of the one or more system-selected remedial actions to the one or more problematic system behaviors in the database system, to obtain the plurality of attributes associated with the plurality of applications of the one or more system-selected remedial actions.

5. The one or more media of claim 1, further storing instructions which, when executed by one or more processors, cause:
determining a second predicted effectiveness of one or more future applications of a second remedial action to the particular problematic system behavior in the database system;
determining, based on a comparison of the first predicted effectiveness and the second predicted effectiveness, that the first remedial action is a better candidate than the second remedial action to remediate the particular problematic system behavior.

6. The one or more media of claim 5, further storing instructions which, when executed by one or more processors, cause:
determining that the second remedial action is compatible with the first remedial action, and applying both the first remedial action to the particular problematic system behavior and the second remedial action to the particular problematic system behavior.

7. The one or more media of claim 1, further storing instructions which, when executed by one or more processors, cause:
receiving, via an administrative interface of the database system, user input to configure the one or more performance criteria by adjusting an expected amount of time needed to troubleshoot unsolved problematic system behavior;
configuring the one or more performance criteria based at least on the user input.

8. The one or more media of claim 1, wherein the plurality of attributes associated with the plurality of applications of the one or more system-selected remedial actions comprise at least:
a first subset of the plurality of attributes associated with a first application of the first remedial action to the particular problematic system behavior; and
a second subset of the plurality of attributes associated with a second application of the first remedial action to the particular problematic system behavior.

9. The one or more media of claim 1, wherein determining that the predicted effectiveness of the one or more future applications of the first remedial action is positive but does not satisfy the one or more performance criteria comprises:
predicting that a series of applications of the first remedial action to the particular problematic system behavior is effective but decreasing in effectiveness.

10. The one or more media of claim 1, wherein determining that the predicted effectiveness of the one or more future applications of the first remedial action is positive but does not satisfy the one or more performance criteria comprises:
predicting that after the one or more future applications of the first remedial action, the problematic system behavior will return within a threshold amount of time.

11. The one or more media of claim 1, wherein determining the first predicted effectiveness of the one or more future applications of the first remedial action to the particular problematic system behavior is further based on metadata describing one or more manual actions performed on the database system.

12. The one or more media of claim 11, wherein the one or more manual actions comprise replacing a physical component of the database system.

13. The one or more media of claim 1, wherein determining the first predicted effectiveness of one or more future applications of the first remedial action to the particular problematic system behavior in the database system comprises:
applying current system state data to a machine learning model configured to predict future effectiveness of remedial actions.

14. The one or more media of claim 13, further storing instructions which, when executed by one or more processors, cause:
training the machine learning model, using the plurality of attributes associated with the plurality of applications of the one or more system-selected remedial actions to the one or more problematic system behaviors in the database system.

15. The one or more media of claim 1, wherein the particular problematic system behavior is associated with increased database response time.

16. The one or more media of claim 1, wherein the particular problematic system behavior is associated with increased processor utilization.

17. The one or more media of claim 1, wherein the particular problematic system behavior is associated with reduced available database storage.

18. The one or more media of claim 1, wherein the particular problematic system behavior is associated with an increased database request rate.

19. The one or more media of claim 1, wherein the notification comprises a link to a graphical user interface for causing a different user-selected remedial action to address the one or more problematic system behaviors.

20. The one or more media of claim 1, wherein the notification comprises a link to a graphical user interface for increasing a weight of a user-selected different remedial action for the one or more problematic system behaviors when the one or more problematic system behaviors recur.

21. The one or more media of claim 1, wherein the notification comprises a link to a graphical user interface for defining a new remedial action for the one or more problematic system behaviors when the one or more problematic system behaviors recur.

22. The one or more media of claim 1, wherein the notification comprises a link to a graphical user interface for marking the one or more problematic system behaviors as resolved.

23. The one or more media of claim 1, wherein the notification comprises a link to a graphical user interface for clearing a memory of a machine learning engine about attempted remedial actions for the one or more problematic system behaviors prior to a particular date.

24. The one or more media of claim 1, wherein determining that the predicted effectiveness of the one or more future applications of the first remedial action is positive but does not satisfy the one or more performance criteria comprises:
predicting that, whether or not the first remedial action is applied to the particular problematic system behavior, the database system will enter a critical operational state within a certain window of time into the future; and
predicting that the first remedial action will have a positive effect on the database system.

25. A system comprising:
at least one device including a hardware processor;
the system being configured to perform operations comprising:
based at least on a plurality of attributes associated with a plurality of applications of one or more system-selected remedial actions to one or more problematic system behaviors in a database system: determining a first predicted effectiveness of one or more future applications of a first remedial action to a particular problematic system behavior in the database system as of one or more future times;
determining that the first predicted effectiveness of the one or more future applications of the first remedial action is positive but does not satisfy one or more performance criteria;
responsive to determining that the first predicted effectiveness of the one or more future applications of the first remedial action is positive but does not satisfy the one or more performance criteria:
generating a notification corresponding to the first predicted effectiveness of the one or more future applications of the first remedial action not satisfying the one or more performance criteria;
applying the first remedial action to the particular problematic system behavior despite already determining that the first predicted effectiveness of the one or more future applications of the first remedial action does not satisfy the one or more performance criteria.

26. A method comprising:
based at least on a plurality of attributes associated with a plurality of applications of one or more system-selected remedial actions to one or more problematic system behaviors in a database system: determining a first predicted effectiveness of one or more future applications of a first remedial action to a particular problematic system behavior in the database system as of one or more future times;
determining that the first predicted effectiveness of the one or more future applications of the first remedial action is positive but does not satisfy one or more performance criteria;
responsive to determining that the first predicted effectiveness of the one or more future applications of the first remedial action is positive but does not satisfy the one or more performance criteria:
generating a notification corresponding to the first predicted effectiveness of the one or more future applications of the first remedial action not satisfying the one or more performance criteria;
applying the first remedial action to the particular problematic system behavior despite already determining that the first predicted effectiveness of the one or more future applications of the first remedial action does not satisfy the one or more performance criteria,
wherein the method is performed by at least one device comprising a hardware processor.

* * * * *

UNITED STATES PATENT AND TRADEMARK OFFICE
CERTIFICATE OF CORRECTION

PATENT NO. : 11,288,117 B2  
APPLICATION NO. : 16/532548  
DATED : March 29, 2022  
INVENTOR(S) : Sutton et al.

Page 1 of 1

It is certified that error appears in the above-identified patent and that said Letters Patent is hereby corrected as shown below:

In the Specification

In Column 6, Line 67, delete "behaviors" and insert -- behaviors. --, therefor.

In Column 11, Line 56, delete "by" and insert -- be --, therefor.

In Column 14, Line 44, delete "leve)" and insert -- level) --, therefor.

In Column 21, Line 30, delete "etc.)" and insert -- etc.). --, therefor.

In Column 21, Line 56, delete "micro services." and insert -- microservices. --, therefor.

Signed and Sealed this  
Sixth Day of September, 2022

Katherine Kelly Vidal  
*Director of the United States Patent and Trademark Office*